United States Patent [19]

Yanase

[11] Patent Number: 5,788,272
[45] Date of Patent: Aug. 4, 1998

[54] VEHICLE SEAT WITH SIDE AIR BAG ASSEMBLY

[75] Inventor: Hitoshi Yanase, Toyota, Japan

[73] Assignee: Araco Kabushiki Kaisha, Aichi-ken, Japan

[21] Appl. No.: 757,794

[22] Filed: Nov. 27, 1996

[30] Foreign Application Priority Data

Nov. 29, 1995 [JP] Japan ..................... 7-311222

[51] Int. Cl.$^6$ ..................... B60R 21/22
[52] U.S. Cl. ..................... 280/730.2; 280/728.3
[58] Field of Search ..................... 280/728.3, 730.1, 280/730.2

[56] References Cited

U.S. PATENT DOCUMENTS

| 5,531,471 | 7/1996 | Terai | 280/728.3 |
| 5,651,582 | 7/1997 | Nakano | 280/730.2 |

FOREIGN PATENT DOCUMENTS

| A-673807 | 9/1995 | European Pat. Off. | |
| 9313068 U | 4/1994 | Germany | |
| 4-50052 | 2/1992 | Japan | |
| 4-356246 | 12/1992 | Japan | |
| 2246983 | 2/1992 | United Kingdom | 280/728.3 |

*Primary Examiner*—Eric D. Culbreth
*Attorney, Agent, or Firm*—Hazel & Thomas, P.C.

[57] ABSTRACT

A vehicle seat equipped with a side air bag assembly the air bag of which is assembled within a side cavity formed in one side of a back rest of the vehicle seat in a folded condition. A rear attachment board is mounted on a support frame of the back rest, the rear attachment board having a back portion formed to cover the rear face of the back rest and a side portion formed to cover the air bag in the side cavity. The side portion of the rear attachment board is formed with an opening which is opposed to the air bag in the side cavity and closed by a door plate hinged at one side thereof to the rear attachment board at one side of the opening to be opened outwardly when a thrust force caused by inflation of the air bag is applied. The door plate is normally retained in a closed position by engagement with the other side of the opening.

3 Claims, 4 Drawing Sheets

5,788,272

VEHICLE SEAT WITH SIDE AIR BAG ASSEMBLY

BACKGROUND OF THE INVENTION

1. Field of the Invention

The present invention relates to a vehicle seat equipped with a side air bag assembly mounted within one side of a back rest of the vehicle seat to ensure safety of a passenger from a great impact applied to a side portion of the vehicle body from the exterior in the occurrence of a collision.

2. Description of the Prior Art

In Japanese Patent Laid-open Publication No. 4(1992)-356246, there has been proposed a vehicle seat equipped with a side air bag assembly of this type which is composed of a casing housed within a side cavity formed in one side of a back rest of the vehicle seat and fixed to a support frame of the back rest, an inflator contained within the casing, an air bag assembled within the casing in a folded condition to be inflated by activation of the inflator and an air bag lid assembled with the casing to cover an opening of the casing. The air bag lid is hinged with an opening end of the casing at its base end to be opened outwardly when applied with a thrust force caused by inflation of the air bag.

In that conventional side air bag assembly, it is, however, difficult to adjust a load acting on the air bag at a movable end of the air bag lid engaged with the opening end of the casing. When the air bag lid is covered with the seat cover of the back rest so as to conceal the air bag and to retain the air bag lid under load of a predetermined force, it is required to properly adjust a seamed portion of the seat cover where the air bag lid is opened outwardly to permit inflation of the air bag. However, the destruction strength of the seam portion is greatly influenced by the outer skin material of the seat cover and the sewing thread used. For this reason, the outer skin material of the seat cover is limited to an outer skin material such a vinyl chloride leather or a thin knitted cloth breakable at the seamed portion, and the sewing thread is limited to a thread releasable at the seamed portion. When a natural leather or a thick knitted cloth is used as the seat cover, it is required to increase the explosive force of the inflator. In addition, when it is desired to inspect the air bag assembly, the seat cover must be fully removed. This results in a greater level of difficulty in the maintenance and inspection of the air bag assembly.

SUMMARY OF THE INVENTION

It is, therefore, a primary object of the present invention to provide a vehicle seat equipped with a side air bag assembly wherein the back rest of the vehicle can be designed in a desired form of high quality without any restriction to the material and design of the seat cover, and wherein the air bag assembly can be inspected in a simple manner for maintenance.

According to the present invention, the object is accomplished by providing a vehicle seat equipped with a side air bag assembly, the air bag of which is assembled within a side cavity formed in one side of the back rest of the vehicle seat in a folded condition, wherein a rear attachment board Is mounted on a support frame of the back rest. The rear attachment board has a back portion formed to cover the rear face of the back rest and a side portion formed to cover the air bag in the side cavity. The side portion of the rear attachment board is formed with an opening which is opposed to the air bag in the side cavity and closed by a door plate hinged at one side thereof to the rear attachment board at one side of the opening to be opened outwardly when applied with a thrust force caused by inflation of the air bag. The door plate is normally retained in a closed position by engagement with the other side of the opening.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENTS

Figure 1:
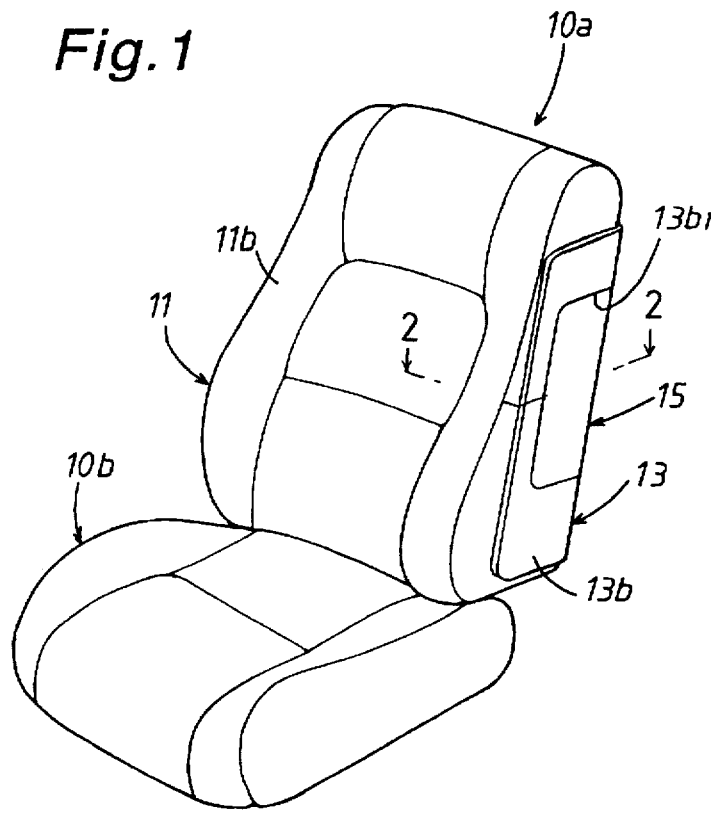
FIG. 1 is a perspective view of a vehicle seat equipped with a side air bag assembly in accordance with the present invention.
Figure 2:
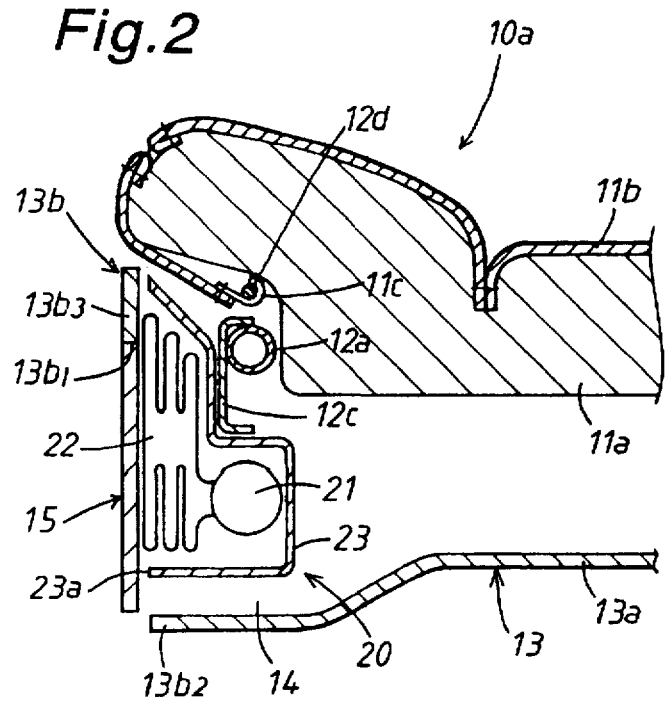
FIG. 2 is a sectional view taken along line 2—2 in FIG.
Figure 4:
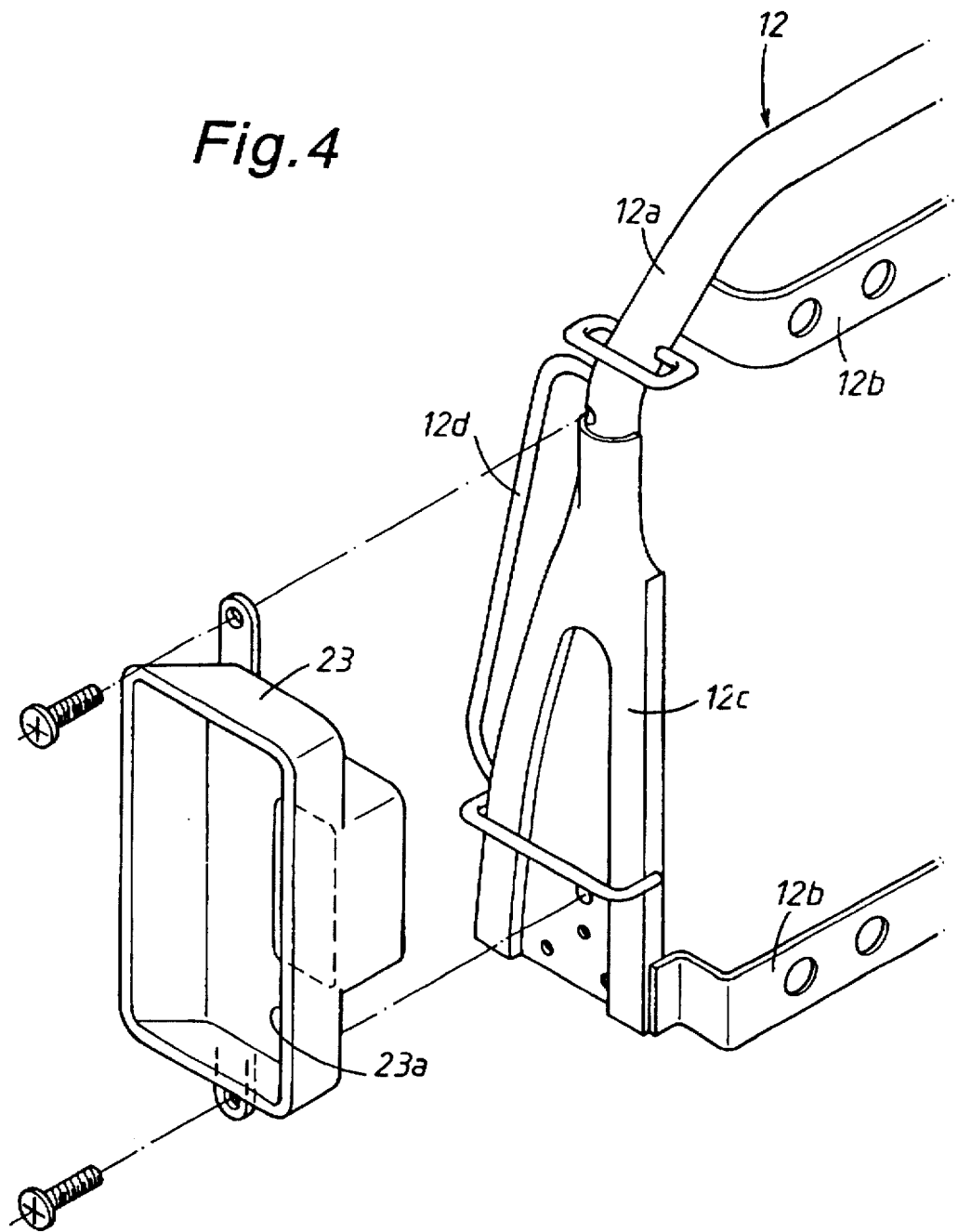
FIG. 4 is a perspective view of a back frame assembly of a back rest of the vehicle seat shown in FIG. 1 and a casing to be mounted on one side of the back frame.

Illustrated in FIG. 1 of the drawings is a vehicle seat equipped with a side air bag assembly 20 mounted within one side of a back rest 10a of the vehicle seat as shown in FIG. 2. The back rest 10a of the vehicle seat is in the form of a back rest cushion 11 supported by a back frame assembly 12 shown in FIG. 4. The back rest cushion 11 is composed of a cushion pad 11a covered with a seat cover 11b. As shown in FIG. 4, the back frame assembly 12 includes a U-letter shaped main frame 12a, a pair of vertically spaced lateral support members 12b fixed to the main frame 12a, a pair of vertical brackets 12c fixed to the opposite sides of the main frame 12a and a pair of support rods 12d fixed to the opposite sides of main frame 12a. As shown in FIG. 2, the seat cover 11b is provided at its opposing sides with a plurality of hooks 11c which are engaged with the support rods 12d of back frame assembly 12 to retain the cushion pad 11a on the back frame assembly 12.

The side air bag assembly 20 is housed within a side cavity 14 formed by a rear attachment board 13 which is fixed to the lateral support members 12b of back frame assembly 12 and spaced at a predetermined distance from the rear face of back rest cushion 11. The rear attachment board 13 is in the form of a seat back board covered with an outer skin material. The rear attachment board 13 has a back portion 13a formed to cover the rear face of back rest cushion 11 and a pair of laterally spaced side portions 13b formed to cover both the side faces of back rest cushion 11. The side cavity 14 has a vertical rectangular opening covered by the side portion 13b of rear attachment board 13.

Figure 3:
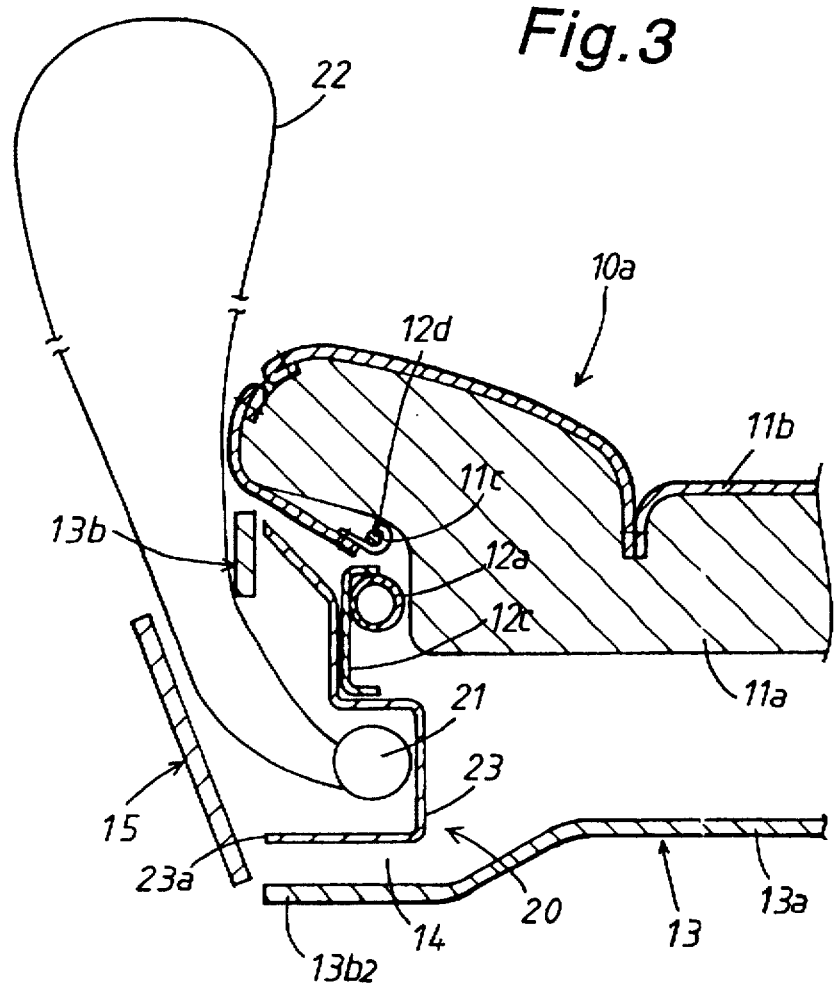
FIG. 3 Is a sectional view illustrating an inflated condition of an air bag in the side air bag assembly shown in FIG. 2.

The air bag assembly 20 includes an inflator 21 housed within a casing 23 mounted on the vertical bracket 12c of back frame assembly 12 as shown in FIG. 4 and an air bag 22 connected with the inflator 21 and contained in the casing 23 in a folded condition. The inflator 21 is connected to a collision sensor (not shown) mounted on a side portion of the vehicle body such as a side door. When the occurrence of collision at the side portion of the vehicle body is detected by the collision sensor, the inflator 21 is activated by an electric signal applied from the collision sensor under control of an electric controller (not shown) to inflate the air bag 22 at the side portion of the back rest 10a as shown in FIG. 3.

As shown in FIGS. 1 and 2, one of the side portions 13b of the rear attachment board 13 is formed larger in size than the opening 23a of the casing 23. The side portion 13b is formed with a vertical rectangular opening $13b_1$ which is opposed to the side cavity 14. The vertical rectangular opening $13b_1$ of the side portion 13b is normally closed by a door plate 15 hinged at its rear end 15a to the rear attachment board 13 at the rear edge $13b_2$ of the vertical rectangular opening $13b_1$.

Figure 5:
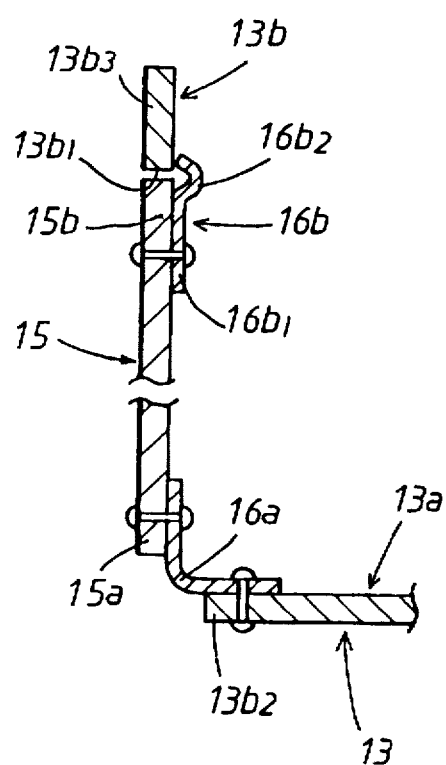
FIG. 5 is a sectional view illustrating a hinged portion of a door plate assembled with a rear attachment board shown in FIG. 1.

As shown in FIG. 5, the door plate 15 is assembled with the rear edge $13b_2$ of vertical rectangular opening $13b_1$ at its rear end 15a by means of vertically spaced hinges 16a to be opened outwardly. A pair (not shown) of the hinges 16a are used to connect with the rear end 15a. The door plate 15 is provided with a pair of vertically spaced retainers 16b fixed to its front end 15b. The retainers 16b are riveted at their body portions $16b_1$ to an inner surface of the front end 15b of door plate 15 and engaged at their hook portions $16b_2$ with an inner surface of the front edge $13b_3$ of vertical rectangular opening 13b. The hook portions $16b_2$ of retainers 16b each are formed to be resiliently engaged with the front edge $13b_3$ of opening $13b_1$.

Assuming that the air bag 22 has been inflated by activation of the inflator 21 in the occurrence of collision at the side portion of the vehicle, the door plate 15 is applied with a thrust force from the interior. In this instance, the retainers 16b are disengaged from the front edge $13b_3$ of opening $13b_1$, and the door plate 15 is opened outwardly to permit the Inflation of the air bag 22 as shown in FIG. 3. Thus, the air bag 22 acts to protect a passenger on the vehicle seat against impact in the vehicle collision.

Since in the vehicle seat, the door plate 15 is assembled with one of the side portions 13b of the rear attachment board 13 and is normally retained in the closed position by resilient engagement with the front edge $13b_3$ of the vertical rectangular opening $13b_1$ to permit inflation of the air bag 22, a load acting on the air bag can be adjusted in a simple manner at the engagement portion of the door plate 15 with the front edge $13b_3$ of opening $13b_1$. Thus, the back rest 10a of the vehicle seat can be designed in a desired form without any restriction to the material and design of the seat cover 11b to provide a vehicle seat of high quality with a superior appearance. In addition, maintenance and inspection of the air bag assembly 20 can be carried out in a simple manner by opening of the door plate 15.

Although in the embodiment described above, the door plate 15 has been hinged at its rear end to the rear attachment board 13 at the rear edge of the vertical rectangular opening $13b_1$ by means of the hinges 16a, the door plate 15 may be hinged at its rear end to the rear attachment board 13 by means of a hinge portion integrally formed with the rear attachment board 13 at the rear edge of the vertical rectangular opening $13b_1$. The door plate-15 may be also resiliently engaged at its front end 15b with the front edge $13b_3$ of the vertical rectangular opening $13b_1$ in an appropriate manner without the provision of the retainers 16b.

What is claimed is:

1. A vehicle seat equipped with a side air bag assembly, said side air bag assembly comprising:

an air bag assembled in a folded condition within a side cavity formed in one side of a back rest of the vehicle seat;

a rear attachment board mounted on a support frame of the back rest, the rear attachment board having a back portion formed to cover a rear face of the back rest and a side portion formed to cover the air bag in the side cavity, wherein the side portion of the rear attachment board is formed with an opening oppositely positioned relative to the air bag in the side cavity; and a door plate for covering the opening and hinged at one side thereof to the rear attachment board along a first side of the opening so as to be opened outwardly when a thrust force caused by inflation of the air bag is applied, the door plate including means for engaging the door plate with a second side of the opening whereby the door plate is retained in a normally closed position.

2. A vehicle set as claimed in claim 1, wherein said engaging means of said door plate includes a retainer that resiliently engages another side of said door plate with the second side of said opening so as to retain the door plate in the normally closed position.

3. A vehicle seat equipped with a side air bag assembly, said side air bag assembly comprising:

an air bag assembled in a folded condition within a side cavity formed in one side of a back rest of the vehicle seat;

a rear attachment board mounted on a support frame of the back rest, the rear attachment board having a back portion formed to cover a rear face of the back rest and a side portion formed to cover the air bag in the side cavity, wherein the side portion of the rear attachment board is formed with a vertical rectangular opening oppositely positioned relative to the air bag in the side cavity; and a door plate hinged at a rear end thereof to the rear attachment board at a rear edge of the vertical rectangular opening so as to be opened outwardly when a thrust force caused by inflation of the air bag is applied, the door plate having means for engaging the door plate with a front edge of the opening whereby the door plate is retained in a normally closed position.

* * * * *